US010373202B2

(12) United States Patent
Kanter et al.

(10) Patent No.: US 10,373,202 B2
(45) Date of Patent: Aug. 6, 2019

(54) SELECTION OF REGION-SPECIFIC BRAND PAGES BASED ON LOCATION INFORMATION OF SOCIAL NETWORKING SYSTEM USERS

(71) Applicant: Facebook, Inc., Menlo Park, CA (US)

(72) Inventors: Jeffrey Andrew Kanter, San Francisco, CA (US); Jack William Lindamood, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 334 days.

(21) Appl. No.: 13/705,586

(22) Filed: Dec. 5, 2012

(65) Prior Publication Data

US 2014/0156749 A1 Jun. 5, 2014

(51) Int. Cl.
*G06Q 30/02* (2012.01)

(52) U.S. Cl.
CPC ................................ *G06Q 30/0261* (2013.01)

(58) Field of Classification Search
CPC .... G06Q 30/02; G06Q 50/01; G06Q 30/0269; G06F 17/3087; G06F 17/289; G06F 17/30; G06F 17/30241; G06F 17/30699; G06F 17/30867; G06F 17/30967; Y10S 707/918; Y10S 707/919
USPC ........................................................ 709/204
See application file for complete search history.

(56) References Cited

U.S. PATENT DOCUMENTS

| | | | | |
|---|---|---|---|---|
| 6,154,172 A * | 11/2000 | Piccionelli | ........... | G06F 17/3087 342/357.4 |
| 8,447,643 B2 * | 5/2013 | Barnes, Jr. | ........... | G06F 3/04847 705/7.29 |
| 8,527,357 B1 * | 9/2013 | Ganesan | ................ | G06Q 30/06 705/26.1 |
| 8,838,572 B2 * | 9/2014 | Lin | .................... | G06F 17/30958 707/709 |
| 8,862,497 B2 * | 10/2014 | Pilskalns | ................. | G06Q 30/02 705/14.11 |
| 8,909,542 B2 * | 12/2014 | Montero | ............. | G06Q 30/0203 705/14.17 |
| 9,691,073 B2 * | 6/2017 | Tseng | ....................... | H04W 4/21 |
| 2002/0160766 A1 * | 10/2002 | Portman | ............. | G06F 17/3043 455/422.1 |
| 2005/0216547 A1 * | 9/2005 | Foltz-Smith | ........... | G06Q 30/02 709/200 |
| 2006/0271531 A1 * | 11/2006 | O'Clair | .............. | G06Q 30/0205 |
| 2007/0124201 A1 * | 5/2007 | Hu | .......................... | G06F 21/10 705/14.2 |

(Continued)

*Primary Examiner* — Kevin T Bates
*Assistant Examiner* — Ronak Patel
(74) *Attorney, Agent, or Firm* — Fenwick & West LLP

(57) ABSTRACT

A social networking system generates a region-specific brand page for presentation to a requesting a brand paged based on location information associated with the user. The region-specific brand page includes data about the brand and aggregated data about users' actions associated with the brand in the social networking system and is presented in a format determined in part by the location information associated with the user. Additionally, the region-specific brand page may include data describing interactions with the brand by users connected to the user viewing the brand page, even if the connected users are associated with location information associated with a different geographic region than the user.

19 Claims, 3 Drawing Sheets

(56) References Cited

U.S. PATENT DOCUMENTS

| | | | |
|---|---|---|---|
| 2008/0294607 A1* | 11/2008 | Partovi | G06Q 30/00 |
| 2009/0112600 A1* | 4/2009 | Gilbert | G10L 15/193 |
| | | | 704/270.1 |
| 2009/0150389 A1* | 6/2009 | Knorr | 707/5 |
| 2010/0325129 A1* | 12/2010 | Ahuja | G06F 17/30867 |
| | | | 707/759 |
| 2011/0004519 A1* | 1/2011 | Aleong | G06Q 10/10 |
| | | | 705/14.53 |
| 2011/0145064 A1* | 6/2011 | Anderson | G06Q 30/02 |
| | | | 705/14.53 |
| 2011/0191417 A1* | 8/2011 | Rathod | G06Q 30/02 |
| | | | 709/204 |
| 2011/0252050 A1* | 10/2011 | Palleti | G06F 17/3087 |
| | | | 707/769 |
| 2012/0016817 A1* | 1/2012 | Smith | G06N 20/00 |
| | | | 706/12 |
| 2012/0310968 A1* | 12/2012 | Tseng | G06F 17/30247 |
| | | | 707/769 |
| 2013/0046823 A1* | 2/2013 | Mitchell et al. | 709/204 |
| 2013/0054631 A1* | 2/2013 | Govani | G06F 17/30867 |
| | | | 707/767 |
| 2013/0073336 A1* | 3/2013 | Heath | 705/7.29 |
| 2013/0073388 A1* | 3/2013 | Heath | 705/14.53 |
| 2013/0073400 A1* | 3/2013 | Heath | 705/14.73 |
| 2013/0073583 A1* | 3/2013 | Licata et al. | 707/769 |
| 2013/0103758 A1* | 4/2013 | Alison | G06Q 30/02 |
| | | | 709/204 |
| 2013/0104026 A1* | 4/2013 | Reynar | G06Q 30/02 |
| | | | 715/234 |
| 2013/0325550 A1* | 12/2013 | Varghese et al. | 705/7.31 |
| 2013/0346919 A1* | 12/2013 | Adderton | 715/835 |
| 2014/0006129 A1* | 1/2014 | Heath | G06Q 30/0222 |
| | | | 705/14.23 |
| 2014/0019532 A1* | 1/2014 | Jia | H04L 67/22 |
| | | | 709/204 |
| 2014/0122053 A1* | 5/2014 | Lotan et al. | 704/2 |
| 2014/0136541 A1* | 5/2014 | Farahat et al. | 707/740 |
| 2014/0164098 A1* | 6/2014 | Chanda | G06Q 30/0277 |
| | | | 705/14.43 |

* cited by examiner

SELECTION OF REGION-SPECIFIC BRAND PAGES BASED ON LOCATION INFORMATION OF SOCIAL NETWORKING SYSTEM USERS

BACKGROUND

This invention relates generally to social networking, and more specifically to structuring and managing pages maintained by a social networking system.

A social networking system frequently maintains various pages dedicated to a topic of interest, such as a brand, product, business, organization, person, or group. Pages may be created and managed by users of the social networking system. Users of a social networking system include individual users and non-individual entities, such as businesses, companies, and vendors. Individual users may express interest in ("like") pages in the social networking system and post content on the pages, allowing users managing the pages or otherwise associated with the page to interact with other users through the social networking system.

Moreover, pages with similar content or topics of interest may be associated with each other or related via the social networking system. For example, multiple pages may be created for an entity, such as a company or a brand. If a company has numerous physical locations in a geographic region, a page may be created for each physical location; for example, a company may create a page associated with different retail outlets associated with the company. Thus, if a user searches for a page associated with the company, the user may be presented with multiple pages associated with the company's numerous physical locations. This may create confusion to the user as to which page is the official page or the most relevant page for viewing.

Additionally, a company or brand may create different pages for presentation to social networking system users in various countries or geographic regions. When a user in a particular geographic region searches the social networking system for a page associated with the company or brand, the user may be presented with multiple pages each associated with various physical locations and/or geographic regions in which the brand has a business or a commercial presence. The presented pages may include pages with different languages and/or content that is not relevant to the user, although a page associated with a geographic region including the user searching for content is most relevant to the user. For example, a user in France is likely most interested in a page written in French and displaying content relevant to users in France and has little interest in viewing a page written in Japanese. However, it may difficult or frustrating for a user to identify an official page for the business or which page is most relevant for the user's geographic region or preferred language from multiple pages. Additionally, an entity or brand may benefit from managing the brand experience for its users across geographic regions.

SUMMARY

A social networking system displays brand pages maintained by third-party entities, allowing the third-party entities to display and promote their products and brand through the social networking system. Users of the social networking system may connect to brand pages and express interest in the brand by interacting with the brand pages. Examples of interactions with a brand page include expressing a preference for the brand page ("liking" the brand page), commenting on the brand page, providing content to the brand page, or other suitable interactions. Third-party entities, such as businesses, having multiple locations, especially those with an international or global presence, may be associated with numerous brand pages in the social networking system.

To improve user interactions with a third-party entity, the social networking system may provide users with brand pages associated with the third-party entity that are customized to the geographic region of a user viewing the brand pages. The social networking system determines a user's geographic region based on the user's reported location or by analyzing user actions logged by the social networking system. For example, locations to which a user checked-in and content associated with the user and tagged with location data may be used to determine the user's geographic region. Based on the geographic region determined for the user, the social networking system selects a brand page associated with a third-party entity for presentation to the user (a "region-specific brand page").

The selected region-specific brand page may present information about other social networking system users in the social networking system that have expressed interest in the third-party entity associated with the region-specific brand page. For example, the presented information may include the total number of user check-ins to locations associated with the third-party entity, the total number of users expressing a preference for the third-party entity ("liking" the third-party entity), the total number of users sharing content associated with the third-party entity, the total number of comments about the third-party entity by other users, or other suitable information. The data may be retrieved from a parent brand page that is connected to the region-specific brand page.

Additionally, the region-specific brand page may also display data about users connected to the user viewing the brand page and their connections with the third-party entity. For example, the region-specific brand page may include data about users connected to the user viewing the region-specific brand page that liked the third-party entity, commented about the third-party entity, shared content from the third-party entity, or performed any other suitable action involving the third-party entity. The region-specific brand page is presented to the user as the official or main page associated with the third-party entity in the social networking system. Hence, a user sees a single brand page correlated with the user's geographic region.

Figure 1:
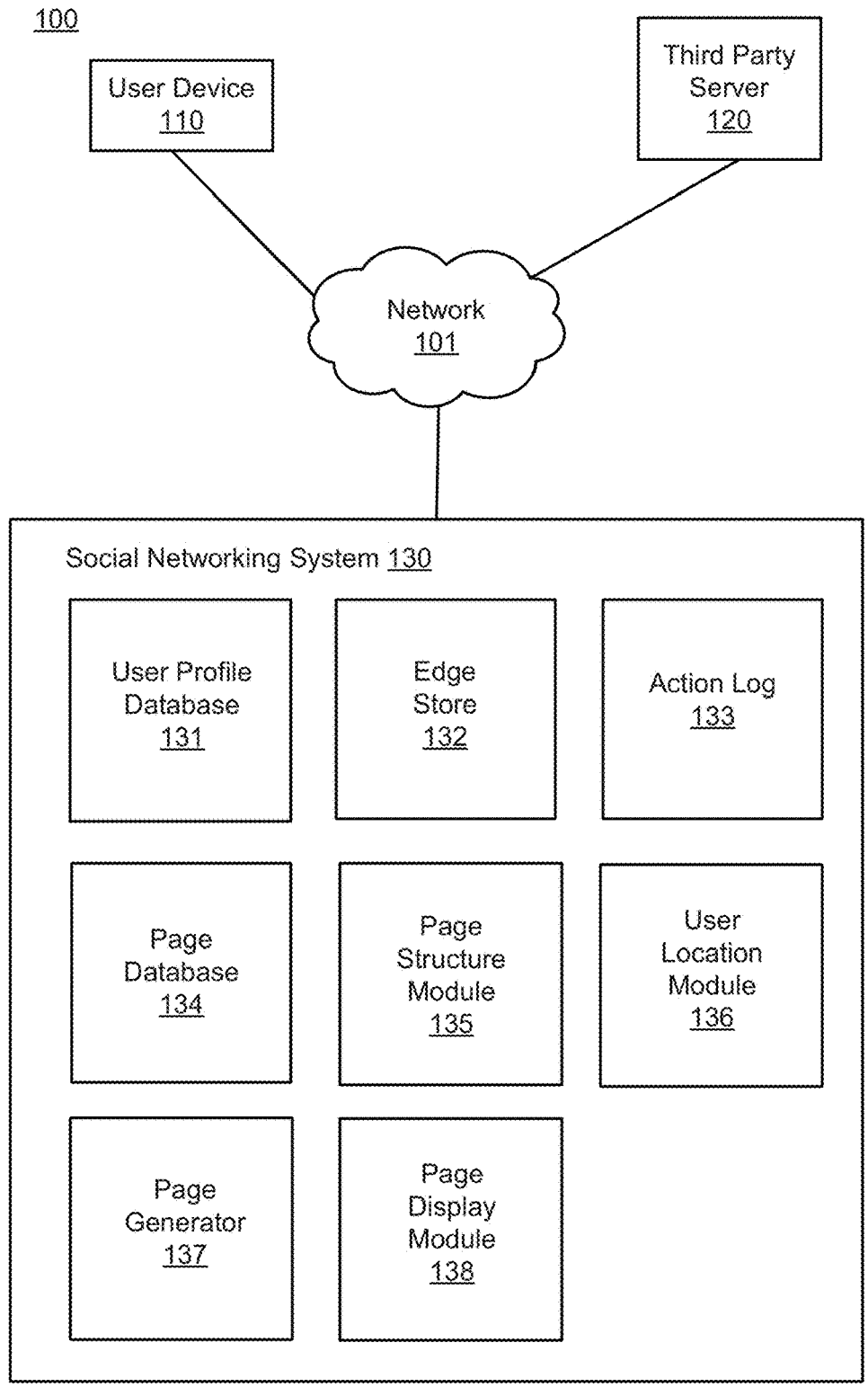
FIG. 1 is a block diagram of a system environment, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows users to communicate and interact with other users. Users join the social networking system and add connections to other users. Each user has a user profile that is associated with user information. The user profile can include information about the user's age, gender, geographic location, education history, work history, and the like. Additionally, users may share information that may be interesting or relevant to other users, such as interests, news, links, comments, photos, or multimedia.

Users of a social networking system may include entities, such as businesses, manufacturers of goods, retailers, corporations, organizations, communities, groups, or other non-individuals. An entity may create and maintain a brand page in the social networking system. The brand page includes information associated with an entity, allowing users to obtain information about the entity via the brand page. Users can connect to the brand page to receive updates or information about the brand or products provided by the brand. Users may also express interest in the brand in the social networking system. For example, users can express a preference for, comment on, or post content about a brand or product on their user profiles or on the brand page.

Brand pages may include text, comments, photos, advertisements, logos or trademarks, location information, product information, marketing materials, uniform resources locators (URL), information about deals or promotions, other related products, upcoming events, or any other information describing the entity associated with the brand. An administrator for the brand page manages the content, display, and/or permissions for presenting content to users of the social networking system via the brand page. The administrator may be a user of the social networking system or an individual associated with the company or brand. Multiple administrators may manage one or more pages associated with the brand. For example, different administrators may manage brand pages corresponding to different geographic regions (e.g., European brand pages, American brand pages, Australian brand pages, etc.).

As used herein, "brand" refers to a name, term, design, symbol, or any other feature that distinguishes an entity's goods or services from those of other entities. Hence, a brand is used to market or commercialize one or more products and is commonly associated with a company or business. For example, COCA-COLA® is a brand owned by the Coca-Cola Company and associated with various types of products provided by the Coca-Cola Company (e.g., DIET COKE®, COKE ZERO®). Also "brand," as used herein, may also refer to one or more products associated with the brand and the company or to a business or an entity associated with the brand. Being associated with a brand page and/or other objects maintained by the social networking system allows the brand or an entity associated with the brand to maintain a presence in a social networking system for interacting with social networking system users.

FIG. 1 is a high-level block diagram of a system environment 100 in which a social networking system 130 operates. The system environment 100 comprises a network 101, a user device 110, a third party server 120, and a social networking system 130. In alternative configurations, different and/or additional components may be included in the system environment 100. Additionally, the embodiments described herein may be adapted to online systems that are not social networking systems.

The network 101 is a communication pathway for one or more user devices 110, the third party server 120, and/or the social networking system 130. The network 101 may comprise any combination of local area and/or wide area networks using wireless and/or wired communication systems. For example, the network 101 may include the Internet, as well as mobile telephone networks. In one embodiment, the network 101 uses standard communications technologies and/or protocols. Hence, the network 101 may include communication links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 101 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 101 may be represented using technologies and/or formats including image data in binary form (e.g. Portable Network Graphics (PNG)), the hypertext markup language (HTML), the extensible markup language (XML), etc. In addition, all or some of the communication links can be encrypted using conventional encryption technologies such as secure sockets layer (SSL), transport layer security (TLS), virtual private networks (VPNs), Internet Protocol security (IPsec), etc. In another embodiment, the entities exchanging data via the network 101 may use custom and/or dedicated data communications technologies instead of, or in addition to, the ones described above.

The user device 110 may be a desktop computer, laptop computer, portable computer, smart phone, personal digital assistant (PDAs) or any other device including computing functionality and data communication capabilities. The user device 110 is configured to communicate with the social networking system 130 or the third party server 120 via the network 101. In one embodiment, the user device 110 executes an application allowing the user of the user device 110 to interact with the social networking system 130 and/or the third party server 120. In some embodiments, the user device 110 includes a positioning system, such as global positioning system (GPS), for determining the location of the user device 110 (e.g., based on latitude and longitudinal coordinates). The location of the user device 110 may be communicated to the social networking system 130 via the network 101. This allows the social networking system 130 to associate the location of the user device 110 with a user accessing the social networking system 130 using the user device 110. For example, an application executing on the user device 110 communicates the location of the user device 110 to the social networking system 130 via the network 101.

The third party server 120 is an external server and may be associated with a third-party entity, such as a business entity, company, corporation or organization. In some embodiments, the third-party entity is associated with a brand, and an administrator for the third-party entity manages one or more pages associated with the brand and maintained by the social networking system 130. When a social networking system user expresses a preference for a brand page ("likes" the brand page) managed by the third-party entity or otherwise connects to the brand page managed by the third-party entity, the user may grant the third party server 120 access to information about the user stored by the social networking system 130, subject to privacy settings specified by the user. For example, a third-party entity associated with a brand page may access information about interests, preferences, and other demographic information maintained by the social networking system 130 about a user connected to the brand page, subject to one or more privacy settings associated with the information by the user.

The third party server 120 may also include a database storing data for one or more web pages associated with the third-party entity, as well as additional data associated with the third-party entity. For example, the database may include information about the web page and/or data about the products on one or more of the web pages. A third-party web page may display information about products, a brand, or a business. Additionally, a third-party web page may also enable the purchase of products. The third party server 120 may provide content, such as web pages to the user device 110 via the network 101, allowing a user to interact with the third party server content through the user device 110 and send information about a user's actions on a third-party web site to the social networking system 130. The user's actions on the third party server 120 may be stored by the social networking system 130 and used to generate and aggregate global or group data about users' actions associated with a brand or other third-party entity associated with the third party server 120.

The social networking system 130 comprises a user profile database 131, an edge store 132, an action log 133, a page database 134, a page structure module 135, a user location module 136, a page determination module 137, and a page display module 138. In other embodiments, the social networking system 130 may include additional, fewer, or different components for various applications. Conventional components such as network interfaces, security functions, load balancers, failover servers, management and network operations consoles, and the like are not shown so as to not obscure the details of the system architecture.

Each user of the social networking system 130 is associated with a user profile, which is stored in the user profile database 131. A user profile includes information about a user that is explicitly provided by the user and can include information inferred by the social networking system 130. In one embodiment, a user profile includes multiple data fields, each data field describing one or more attributes of the user. The user profile information stored in the user profile database 131 may include biographic, demographic, geographic, and other types of descriptive information about the user, such as age, gender, location, hobbies, preferences, interests, work experience, educational history, and the like. Additionally, the user profile is associated with a username, a password, an identification number, one or more verified IP addresses, or other identifying information. Additional examples of identifying information include an email address, a date of birth, location information, or user-specific questions and answers.

The user profile database 131 may also store content items associated with the user profile, such as images, photos, text, and multimedia content, such as videos or audio files. A user profile in the user profile database 131 may also maintain references to actions by the corresponding user performed on content items and stored in the action log 133. The user profile database 131 stores data about posts, comments, status updates, images, links, multimedia, video, or other content that is displayed on the user profile.

In one embodiment, a user profile includes location information specifying the geographic location of a user. For example, the user may identify its location to the social networking system 130 and the identified location is stored in the user's user profile. The social networking system 130 may also poll the user or request the user's location, zip code, city or other geographic information directly from the user. In other embodiments, the user's location may be inferred from a recent check-in location or location data tagged in posted content, such as photos, videos, and status updates. Users may check-in at a business, company, public arena, stadium, tourist location, school, restaurant, street, building, or any other geographically identifiable place and submit the location to the social networking system 130. Additionally, a location of a user device 110 used by the user to access the social networking system 130 may be received and stored in the user profile. The user may also update or change his or her geographic location on the user profile. The geographic location data associated with a user may include the user's country, region, home address, work address, place of residence, one or more check-in locations, or the like. The location may be stored as a street or mailing address, a zip code, a set of coordinates (a latitude and a longitude), a city, a town, or a region, or a combination thereof.

A user profile stored in the user profile database 130 may include multiple locations for a user, such as a permanent residence (e.g., a home address, city, or state) and a current location (e.g., based on recent check-ins or GPS-derived location updates from the user device 110). The user's current location, which may be determined from user check-ins or inferred from user actions and/or content, may frequently differ from the user's permanent residence. Additionally, a user may manually identify its current location and the social networking system 130 may compare the current location provided by the user with location data associated with actions taken by the user. For example, a user may specify a current location of San Francisco, Calif., but may travel abroad and checks-in to several locations in European cities without specifying an updated current location. The social networking system 130 may compare the check-in locations or location data from other user actions with the current location stored in the user profile and determine that the user actions are associated with a location differing from the current location stored in the user profile. In one embodiment, the social networking system 130 may prompt the user to verify its current location based on this discrepancy. In some embodiments, a current location or a permanent residence associated with the user by the user profile is used to determine relevant pages for presenting to the social networking system.

One or more Internet Protocol (IP) addresses or other identifiers associated with user devices 110 may be included in a user profile. The IP address of a user device 110 is a numerical label assigned to each user device 110 participating in a network using the Internet Protocol for communication. The IP address can be mapped to the geographical location of the device user 110, such as the user's country or region, allowing a user's location to be inferred from the geographical region associated with the IP address of a user device 110. A user may also grant permission to the social networking system 130 to receive location information from a user device 110 used by the user to access the social networking system 130. In some embodiments, the user gives permission to the social networking system 130 to determine the user's location based on information associated with the user (e.g., based on the GPS-determined location of the user device 110 or based on the user's check-in or tagged content to a location).

The edge store 132 stores data about the edges, which are connections between users, between objects and/or between users and objects (e.g., pages) in the social networking system 130. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 130, such as expressing interest in a page on the social networking system, sharing a link with other users of the social networking system, and commenting on posts made by other users of the social networking system 130.

The edge store 132 can also store affinity scores for objects, interests, pages, and other users. Affinity scores can be computed by the social networking system 130 over time to approximate a user's affinity for an object, interest, and other users based on the actions performed by the user. A user's affinity may be computed by the social networking system 130 over time to approximate a user's affinity for an object, interest, and other users in the social networking system 140 based on the actions performed by the user. Computation of affinity is further described in U.S. patent application Ser. No. 12/978,265, filed on Dec. 23, 2010, which is hereby incorporated by reference in its entirety. For example, if a user likes a page about Cyclocross bikes and posts frequently about biking, the social networking system 130 can determine that the user has a high affinity for bikes or biking and can calculate an affinity score accordingly. The affinity score can be stored in the edge store 132 in association with the edge and/or the user.

The action log 133 stores information about the actions by users in the social networking system 130 as well as actions by users on websites external to the social networking system, such as the third party server 120. Such actions can include liking or commenting on a post, uploading an image or link, sending or reading a message, clicking on a link or image, viewing content associated with another user, adding content to another user's page, among others. The action log 133 stores actions between a user and a user profile of an entity (e.g., a brand page) within the social networking system 130, or between a user and an object on a user profile of a brand page. Each interaction between a user and an object associated with a brand in the social networking system 130 may be associated with the user performing the interaction as well as the brand and stored in the action log 133 along with identifiers of the user and brand or entity involved in the interaction. In some embodiments, data from the action log 133 is used to infer interests or preferences of the user, augmenting the interests included in the user profile and allowing a more complete understanding of user preferences.

The action log 133 may also store user actions taken on external websites. For example, an e-commerce website that primarily sells sporting equipment at bargain prices may recognize a user of a social networking system 130 through social plug-ins that enable the e-commerce website to identify the user of the social networking system 130. Because users of the social networking system 130 are uniquely identifiable, e-commerce websites, such as this sporting equipment retailer, may use the information about these users as they visit their websites. The action log 133 records data about these users, including webpage viewing histories, advertisements that were engaged, purchases made, and other patterns from shopping and buying.

Hence, user profile store 131, the edge store 132, and the action log 133 allow the social networking system 130 to generate a social graph with nodes connected by edges. Nodes include users and objects of the social networking system 130, such as web pages embodying concepts and entities, and the edges connect the nodes. Some edges between users can be defined by real-life relationships. For example, users may generate edges with other users that are labeled as friends, colleagues, acquaintances, close friends, partners, boyfriend and girlfriend, husband and wife, and so forth. Other edges are generated when users interact with objects in the social networking system 130, such as when a user likes a profile page of a brand or company.

The page database 134 stores data describing the content and layout of pages maintained by the social networking system 130. Examples of information stored by the page database 134 include photos, links, objects, or posts that are associated with and displayed on a page. Additional information stored by the page database 134 includes data about the messages, comments, photos, or other content posted by users on a page. The content may be associated with chronological data and data about the number of users expressing a preference for the content ("liking" the content), the number of users sharing the content, the total number of comments about the content by other users, or other suitable information. For brand pages, the page database 134 includes data about the brand or about an entity associated with the brand and data about the users connected to the brand page or otherwise interacting with the brand page.

The page database 134 may also store data for brand pages associated with specific geographic regions. A brand or entity may be associated with multiple pages each designed for a particular geographic region or country. For example, different brand pages associated with different geographic regions in which an entity or brand has a presence are stored; the different brand pages may have different languages or content depending on the geographic regions with which they are associated. One or more administrators may create and manage a brand page associated with a specific location, region or country. These brand pages are stored in association with the brand or entity in the page database 134.

In some embodiments, a single brand page stored in the page database 134 serves as a template for the related brand pages. The template brand page may be altered in content or design to be customized for an audience in a particular geographic region to create region-specific brand pages. These region-specific brand pages may differ in content, language, design or other features that are chosen for the viewers of a particular geographic region.

The page structure module 135 determines relationships among pages in the page database 134. Relationships between pages may be based on association with the same topic of interest, business, organization, group, or entity. For example, multiple pages for various physical locations of a company may be stored in the page database 134, and the page structure module 135 identifies that the pages are associated with the same company. As an example, a page may be stored for each of the over 19,000 STARBUCKS® store locations in 60 countries around the world, and the page structure module 135 identifies that these pages are associated with STARBUCKS®. In another example, a separate page is created for various products provided by a company (e.g., COKE ZERO®, DIET COKE®, etc.) and the page structure module 135 associates these separate pages with the company. A page may also be created by an individual user when he or she checks-in to a location for a business (e.g., a STARBUCKS® store located on Kearny Street in San Francisco). In one embodiment, the page structure module 135 communicates the relationships between pages and an entity, or relationships between various pages to the edge store 132.

Different pages associated with a brand or an entity may be designed or formatted for presentation to users from different geographic regions. For example, the different pages may be presented to account between differences in language, culture, country or demographic. Location information is associated with region-specific brand pages to identify the geographic locations where a region-specific brand page is displayed. For example, location information associated with a region-specific brand page identifies countries, cities, latitude and longitude, or other information identifying locations or a group of locations. Hence, location information associated with a region-specific brand page may specify a region, a group of countries (European Union countries, Baltic countries, English-speaking countries), a country, a city, or another type of geographic boundary or categorization. For example, an administrator for a MCDONALD'S® brand page in Japan may design a region-specific brand page for Japanese users that includes Japanese language, images of the brand's Japanese products (e.g., a Carbonara Chicken sandwich or a Korokke Burger), or photos of Japanese business locations. Another administrator for a MCDONALD'S® brand page in the United States may create a brand page for viewing users in America with photos and content specific for an American consumer (e.g., including English text, images of the brand's U.S. products, and U.S. deals or promotions). In some embodiments, a single administrator may create and generate different region-specific brand pages associated with the same brand. In other embodiments, multiple administrators generate the different region-specific brand pages for various geographic regions or countries.

In one embodiment, the page structure module 135 organizes pages in a structured or hierarchical manner. For example, a main or official brand page for the brand is identified as a parent page that is designated as the central page in a hub structure of related "child" pages. The parent page includes information common to the related child pages and may be used as an organizational page for connecting and categorizing other pages. A child page includes the same, or a related, topic of interest as the parent page. In one embodiment, a topic of interest associated with a child page may be a sub-category or sub-group of the parent page. Examples of parent page-child page relationships include: the child page "is a store of" the parent page, the child page "is a product of" the parent page, the child page "is a representative of" the parent page, or the child page "is sold at" the parent page.

Other types of relationships between pages may be identified and stored. Child pages having the same topic of interest or a related topic of interest may be connected in a horizontal relationship (e.g., "sibling" relationships). For example, pages for individual Starbucks store locations may be connected to each other because they have the same category of "business." Pages may be structured so a page has a hierarchical relationship with more than one page (e.g., a page may a child page to a parent page and also a parent page to a second child page). This may result in a hierarchal structure of connected pages. Structure and organization of parent pages and child pages is further described in U.S. application Ser. No. 13/312,912, filed on Dec. 6, 2011, which is incorporated by reference in its entirety.

Structured relationships between pages allow data to be shared among pages. In one embodiment, relationships between various pages are used to identify permissions for various pages. For example, an administrator of a page may set permissions allowing data associated with the page to be shared with related pages or with pages having a specified type of connected to the page. In other embodiments, the social networking system 130 allows data to be shared or aggregated among connected or otherwise related pages. For example, a page having a higher location in a hierarchy of pages (e.g., a parent or grandparent of other pages) may have administrative permissions to edit, create, share, or manage information associated with child pages. The data from the parent page (e.g., total number of likes, check-ins, etc.) may be inherited by the child page(s). In some embodiments, data from one or more of the child pages are combined and communicated to the parent page, allowing the parent page to maintain information from various child pages. For example, the number of impressions on a child page (number of views of advertisements by users) is transmitted to the parent page. In another example, a child page may share or communicate data with another related child page.

The user location module 136 retrieves data about a user's location from the user profile database 131. In some embodiments, the user location module 136 infers the user's geographic location from the user's recent check-in location, location-tagged content, or data associated with actions performed by the user within a specified time interval (e.g., within a time interval from a current time). In other embodiments, the user's location may be received from the user device 110. The user location module 136 may also request the location information directly from the user.

A request for a brand page from a user of the social networking system is received by the page generator 137, which obtains location information associated with the user from the user location module 136. Based on the location information associated with the user and the brand or entity associated with the requested brand page, the page generator 137 selects a region-specific brand page from the page database 134. The page generator 137 may retrieve a region-specific brand page associated with location information including the location information associated with the user, allowing presentation of a brand page designated for the country, region, or geographic location including the user's location to be presented. In some embodiments, the region-specific brand page is selected based on the country of the viewing user. For example, location information associated with the user indicates the user is in Paris, France in the user profile, so the page generator 137 retrieves a region-specific brand page associated with location information including France. In other embodiments, the region-specific brand page is selected based on the geographic region of the viewing user. For example, location information associated with the user indicates the user is in Dallas, Tex., so a brand page associated with the Southern region of the United States is selected for the user. In another example, the brand page may be selected based on the language of the viewing user. For example, a language associated with the user is retrieved from the user profile database 131 and compared to languages associated with region-specific brand pages; a region specific-brand page associated with a language matching the language associated with the user is then selected.

In other embodiments, the region-specific brand page selected based on a combination of information, in addition to location information, associated with the user requesting a brand page. Examples of information used for selection of a region-specific brand page include location information, language, permissions for content in a particular region, cultural considerations, and other suitable information. Weights may be associated with different types of information to generate a score associated with a user that is compared to scores associated with region-specific brand pages for selection.

In some embodiments, the page generator 137 presents the selected region-specific brand page to a user as the single brand page associated with the brand or entity. While multiple brand pages may be associated with the brand or entity, the page generator 137 presents the selected region-specific brand page to the user and does not identify other brand pages associated with the brand or entity to the user. If a user's location information is changed, the page generator 137 selects a different region-specific brand page based on the changed location information.

In some embodiments, the page generator 137 retrieves data describing interactions with the selected region-specific brand page or with one or more brand pages associated with a brand for inclusion in the selected region-specific brand page. Based on the structural relationship of brand pages in networking system 130, the page generator 137 may retrieve "global brand" data from a parent page (e.g., the main or official parent page for a brand) of the selected region-specific brand page and/or aggregated data from the pages related to the selected region-specific brand page for presentation by the selected region-specific brand page. In another embodiment, the page generator 137 retrieves data from one or more related region-specific brand pages for display on the selected region-specific brand page. In one example, the page generator 137 retrieves information identifying a number of users expressing a preference for at least one of the brand pages ("liking" at least one of the brand pages) associated with the selected region-specific brand page. As an example, if a parent STARBUCKS® brand page has 32 million likes, the selected region-specific brand page indicate that 32 million people have liked the selected-region specific brand page.

Alternatively, the page generator 137 displays data aggregated from multiple region-specific brand pages having location data within a threshold distance of the location data associated with the selected region-specific brand page. For instance, a brand page associated with STARBUCKS® store in Chicago, Ill. may be associated with 500 check-ins, but the selected region-specific brand page presents an aggregation of check-ins from brand pages associated with STARBUCKS® stores within a threshold distance of the store (e.g., within the Chicago metropolitan area).

The page generator 137 may also generate data describing the number of users "talking about" the brand and display the generated data on the selected region-specific brand page. Actions indicating a user is "talking about" the brand include comments, posts, tagged photos, tagged locations for the brand's businesses, shared links, mentions about the brand in status updates, and the like. Data about the number of users "talking about" the brand may be aggregated from pages related to the selected region-specific brand page.

In one embodiment, the page generator 137 retrieves data about other users connected to the user viewing the selected region-specific brand page ("a viewing user"). For example, the page generator 137 retrieves data from the edge store 132 to identify additional users connected to the viewing user. Data from the action log 133 describing actions by the additional users involving content associated with one or more of the brand pages associated with the entity associated with the selected region-specific brand page. Examples of actions include tagging, liking, sharing content, posting content, transmitting messages, or other suitable action.

For example, a user Bob is located in Flint, Mich. and connected to 80 other users of the social networking system 130. Of those 80 users, 10 of the users may have expressed interest ("liked") a brand page for BMW® cars and 2 of the users may have commented on the brand page. These users may be located in geographic regions different from Bob's location; the users may view and interact with region-specific pages that are different from the region-specific page viewed by Bob. For example, a user Mary that is connected to Bob in the social networking system 130 and lives in Paris, France may like the region-specific BMW® brand page that is specific to users in France. The page generator 137 retrieves the data associated with Mary's interaction with the region-specific brand page for presentation via the different region-specific brand page presented to Bob. The page generator 137 collects the data about the users connected to Bob, regardless of their associated locations, and presents actions associated with the brand performed by the users connected to Bob. For example, a BMW® brand page may be generated for Bob that is specific for the United States, but includes comments and posts associated with BMW® associated with Bob and located in other geographic regions, such as Japan, France, and Australia.

In another embodiment, the page generator 137 retrieves data about other users that are similar to the viewing user and have interacted with a region-specific brand page. Similarity among users may be determined based on various criteria. Example criteria for determining similarity include similar interests (e.g., mutual interest in objects or pages in the social networking system 130) or affinity scores associated with the user for an object, interest, or other users computed by the social networking system 130 using the user's actions in the system over time. Users may also be identified as similar to each other if they have matching or similar demographic information in their user profiles. Examples of demographic information include age, gender, geographic location, education, job, marital status, or the like. For example, data from other users having similar characteristics as Bob (male, similar age range, share common interests in cars and sports) and having liked the BMW® brand page for their particular region may be displayed on the region-specific BMW® brand page presented to Bob (e.g., 5 other similar users have liked BMW®).

The region-specific brand page, in some embodiments, includes multiple of the above-described types of data. For example, the region-specific brand page may include global data from the parent brand page (e.g., total number of likes, check-ins, or "talking about" data), data about users within the threshold distance of the location data associated with the selected region-specific brand page (including users who are not connected to the viewing user), data about users connected to the viewing user (regardless of the connected users' geographic locations), and data from similar users who have interacted with the brand in the social networking system 130. Various combinations of the above-described types of data may be presented on a region-specific brand page in different embodiments.

The page display module 138 receives the generated region-specific brand page from the page generator 137 and displays the page to the viewing user in the social networking system 130. As the page generator 137 selects a region-specific brand page for a user based on the user's geographic location, the page display module 138 presents a different region-specific brand page to various users depending on the location information associated with the users. However, to a particular user it appears that there is a single brand page associated with a brand rather than multiple regional brand pages.

Region-Specific Brand Page Selection

Figure 2:
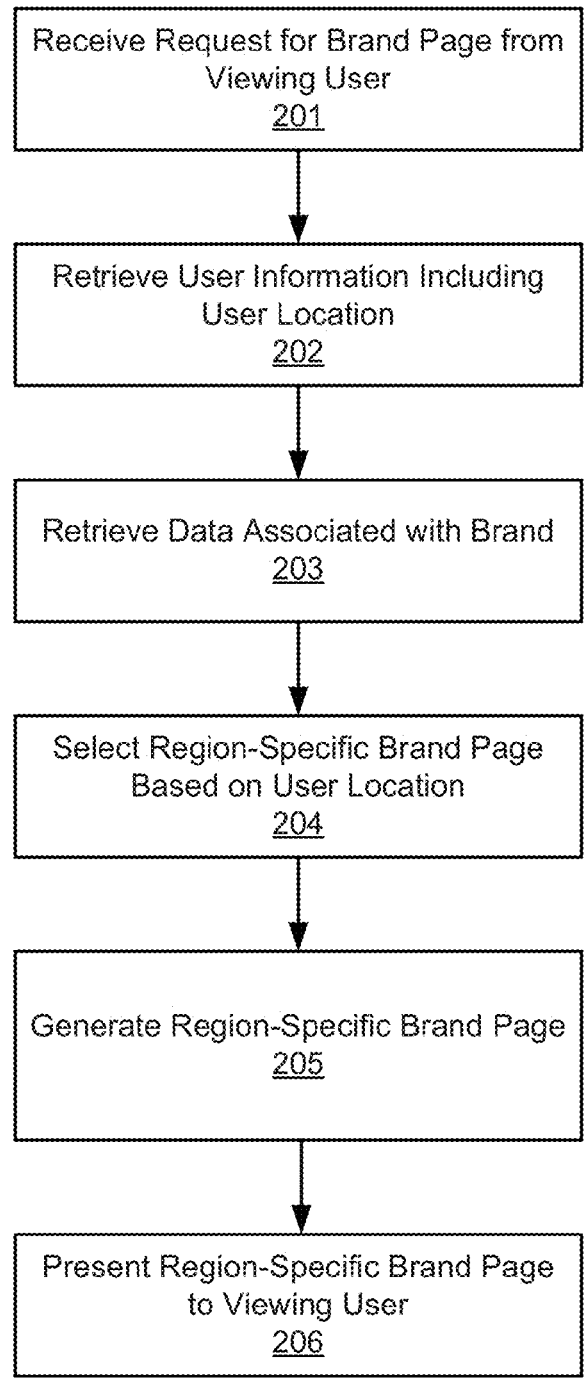
FIG. 2 is a flow chart of a method for selecting a brand page of a social networking system associated with a geographic location, in accordance with an embodiment of the invention.

FIG. 2 illustrates a flow chart of one embodiment of a method of determining a region-specific brand page for a viewing user. The social networking system 130 receives 201 a request for a brand page from a viewing user of the social networking system 130. Information about the viewing user's location is retrieved 202 from the user profile database 131 or from the user location module 136. In one embodiment, information identifying one or more users connected to the viewing user is also retrieved 202 from the edge store 132. Data associated with an entity identified by the request from the brand page is also retrieved 203 from the page database 134 and/or from the action log 133. Examples of data associated with the entity include check-in data, likes, "talking about" data, or other suitable data associated with at least one brand page, or other content, associated with the brand.

Location information associated with the viewing user is compared to location information associated with region-specific brand pages associated with the brand and stored in the page database 134 to select 204 a region-specific brand page. For example, a region-specific brand page associated with location information matching the location information associated with the viewing user is selected 204. As another example, a region-specific brand page associated with location information within a threshold distance of the location information associated with the viewing user is selected 204. In one embodiment, the retrieved data associated with the brand is included in the selected region-specific brand page, as further described above in conjunction with FIG. 1. For example, information describing interactions between users associated with the viewing user and involving an object associated with the brand are included in the selected region-specific brand page. The generated region-specific brand page is presented 206 to the viewing user.

Example Brand Page

Figure 3:
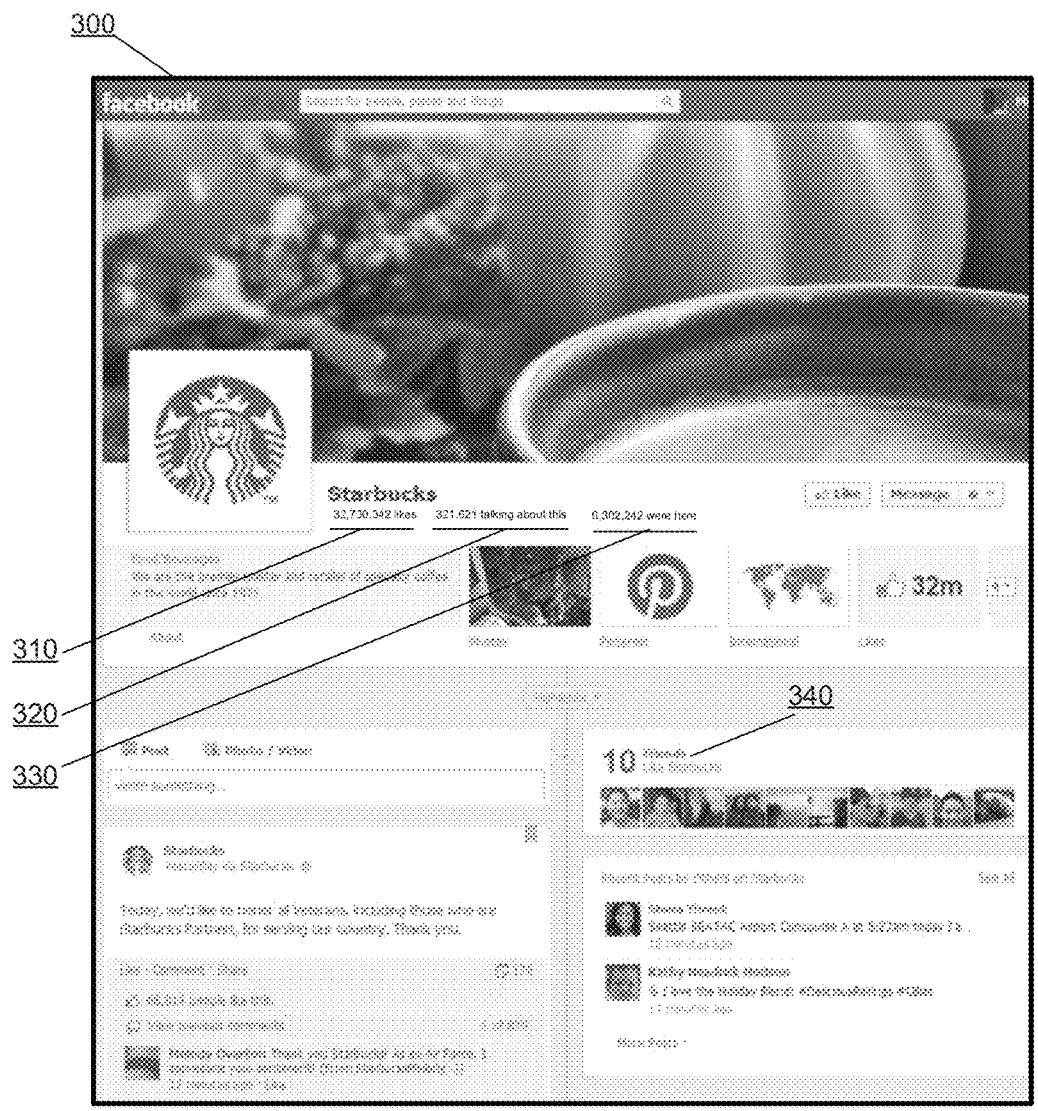
FIG. 3 is an example of a brand page in the social networking system for a particular geographic region, in accordance with an embodiment of the invention.

FIG. 3 is an example brand page 300 presented by the social networking system 130. The example brand page 300 of FIG. 3 is a region-specific brand page for presentation to viewing users in the United States for the STARBUCKS® brand. As shown in FIG. 3, the brand page 300 includes data aggregated from multiple region-specific brand pages. The aggregated data in FIG. 3 shows a number of likes 310 (e.g., "32,730,342 likes"), a number of people "talking about" the brand 320 (e.g., "321,612 talking about this"), and a number of check-ins 330 (e.g., "6,320,242 were here") aggregated from multiple region-specific brand pages associated with the STARBUCKS® brand.

The example brand page 300 shown in FIG. 3 also includes data about the number 340 of users connected to the viewing user indicating a preference for the STARBUCKS® brand ("10 friends like Starbucks") and displays photographs and links for accessing information about the user. The users connected to the viewing user may be located in different geographic locations than the geographic location of the viewing user. Various other types of data from the related STARBUCKS® brand pages may be aggregated and displayed on the region-specific brand page. Additionally, an administrator for the brand may determine the content and design of the region-specific brand page, so the "look" and "feel" of the page is geared towards viewing users in a particular geographic region.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   storing, in a social networking system, a plurality of region-specific brand pages associated with an entity, each region-specific brand page associated with location information identifying a geographic region in which the region-specific brand page is presented and each region-specific brand page including content associated with the entity and accessible by users of the social networking system;
   receiving, by the social networking system, a request from a viewing user for a brand page associated with the entity and connected to the plurality of region-specific brand pages;

identifying, by the social networking system, location information stored by the social networking system that is associated with the viewing user;

selecting, by the social networking system from the plurality of region-specific brand pages, a region-specific brand page based on the request and the location information associated with the viewing user;

retrieving data for inclusion in the selected region-specific brand page describing interactions between users and one or more objects in the social networking system associated with the entity, wherein:

the data includes aggregated data from the plurality of region-specific brand pages associated with the entity; and the interactions described by the aggregated data include an interaction by a user connected by the social networking system to the viewing user with another region-specific brand page of the plurality of region-specific brand pages, the user being associated with different location information from the location information associated with the viewing user; and presenting the selected region-specific brand page including the retrieved data to the viewing user.

2. The method of claim 1, wherein the interactions are between users connected to the viewing user and the one or more objects and the interactions are selected from a group consisting of: expressing a preference for an object associated with the entity, checking-in to a location associated with the entity, sharing content associated with the entity, posting a content associated with the user to the social networking system, posting a photograph associated with the entity, and any combination thereof.

3. The method of claim 1, wherein selecting the region-specific brand page based on the location information associated with the viewing user comprises selecting the region-specific brand page associated with location information matching the location information associated with the viewing user.

4. The method of claim 1, wherein selecting the region-specific brand page based on the location information associated with the viewing user comprises:

selecting a region-specific brand page associated with location information within a threshold distance of the location information associated with the viewing user.

5. The method of claim 1, wherein the selected region-specific brand page includes content presented in a language associated with a geographic region including the location information associated with the selected region-specific brand page.

6. The method of claim 1, wherein the selected region-specific brand page includes content associated with a geographic region including the location information associated with the selected region-specific brand page.

7. The method of claim 1, further comprising:

retrieving one or more actions associated with the viewing user by the social networking system; and determining the location information associated with the viewing user based on the retrieved one or more actions.

8. The method of claim 7, wherein the one or more actions associated with the viewing user are selected from a group consisting of: checking-into a location, tagging a location in a photograph, tagging a location in content provided to the social networking system, and any combination thereof.

9. A method comprising:

storing, in a social networking system, a plurality of region-specific brand pages associated with an entity, each region-specific brand page associated with location information identifying a geographic region in which the region-specific brand page is presented and each region-specific brand page including content associated with the entity and accessible by users of the social networking system;

storing interactions between users of the social networking system and one or more of the plurality of region-specific brand pages associated with the entity;

receiving, by the social networking system, a request from a viewing user for a brand page associated with the entity and connected to the plurality of region-specific brand pages;

identifying, by the social networking system, location information stored by the social networking system that is associated with the viewing user;

selecting, by the social networking system, from the plurality of region-specific brand pages, a region-specific brand page based on the request and the location information associated with the viewing user;

generating data for inclusion in the selected region-specific brand page based on the stored interactions between the users of the social networking system and one or more of the plurality of region-specific brand pages associated with the entity wherein:

the data includes aggregated data from the plurality of region-specific brand pages associated with the entity; and the aggregated data describes an interaction by a user connected by the social networking system to the viewing user with another region-specific brand page of the plurality of region-specific brand pages, the user being associated with different location information from the location information associated with the viewing user; and presenting the selected region-specific brand page including the generating data to the viewing user.

10. The method of claim 9, wherein the data for inclusion in the selected region-specific brand page based on the stored interactions between the users of the social networking system and one or more of the plurality of region-specific brand pages associated with the entity comprises a total number of check-ins associated with the plurality of region-specific brand pages associated with the entity.

11. The method of claim 9, wherein the data for inclusion in the selected region-specific brand page based on the stored interactions between the users of the social networking system and one or more of the plurality of region-specific brand pages associated with the entity comprises a total number of users of the social networking system expressing a preference for at least one of the plurality of region-specific brand pages.

12. The method of claim 9, wherein selecting the region-specific brand page based on the location information associated with the viewing user comprises:

selecting a region-specific brand page associated with location information matching the location information associated with the viewing user.

13. The method of claim 9, wherein selecting the region-specific brand page based on the location information associated with the viewing user comprises:

selecting a region-specific brand page associated with location information within a threshold distance of the location information associated with the viewing user.

14. The method of claim 9, further comprising:
retrieving one or more actions associated with the viewing user by the social networking system; and
determining the location information associated with the viewing user based on the retrieved one or more actions.

15. The method of claim 1, wherein the determined location information identifies a location associated with the viewing user, and wherein selecting the region-specific brand page comprises:
selecting the region-specific brand page from the plurality of region-specific brand pages associated with the entity based on the geographic region associated with the selected region-specific brand page including the location associated with the viewing user.

16. The method of claim 9, wherein the one or more of the plurality of region-specific brand pages are region-specific brand pages having geographic regions within a threshold distance of the geographic region associated with the selected region-specific brand page.

17. The method of claim 1, wherein retrieving data for inclusion comprises:
identifying, from the plurality of region-specific brand pages, a subset of region-specific brand pages associated with location information that is within a threshold distance of location information associated with the selected region-specific brand page;
identifying, for each region-specific brand page from the subset of region-specific brand pages, user interactions associated with the region-specific brand page; and
generating the data for inclusion in the selected region-specific brand page based on the identified interactions.

18. The method of claim 1, wherein the retrieved data describes interactions between users that are similar to the viewing user and the selected region-specific brand page.

19. The method of claim 1, wherein the location information associated with the viewing user is included in a user profile of the viewing user with the social networking system.

* * * * *